(No Model.) 2 Sheets—Sheet 1.
W. B. FOWLE.
CLINICAL METALLIC THERMOMETER.
No. 294,729. Patented Mar. 4, 1884.
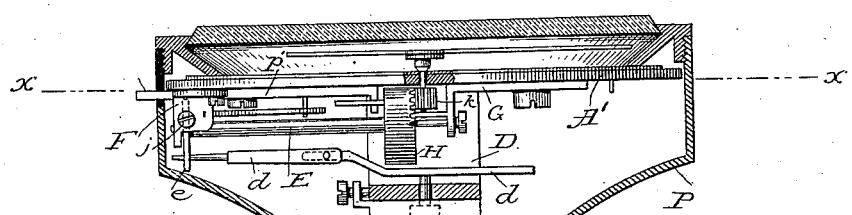
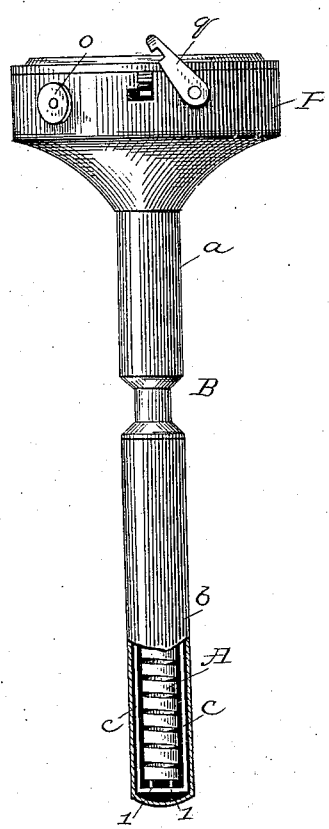
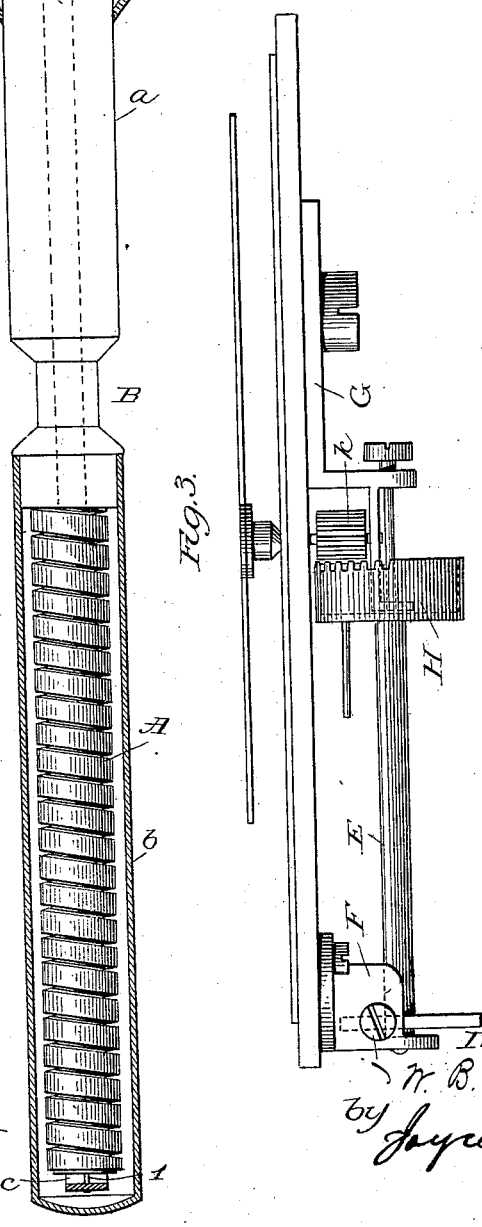

(No Model.) 2 Sheets—Sheet 2.

W. B. FOWLE.
CLINICAL METALLIC THERMOMETER.

No. 294,729. Patented Mar. 4, 1884.

UNITED STATES PATENT OFFICE.

WILLIAM B. FOWLE, OF NEWTON, ASSIGNOR TO ROBERT M. MORSE, JR., OF BOSTON, MASSACHUSETTS.

CLINICAL METALLIC THERMOMETER.

SPECIFICATION forming part of Letters Patent No. 294,729, dated March 4, 1884.

Application filed November 15, 1883. (No model.)

*To all whom it may concern:*

Be it known that I, WILLIAM B. FOWLE, of Newton, in the county of Middlesex and State of Massachusetts, have invented a new and useful Improvement in Clinical Metallic Thermometers; and I do hereby declare that the following is a full, clear, and exact description of the same.

My invention is an improved clinical thermometer, in which an index-finger is moved by the unequal expansion and contraction of different metals, united as laminæ in a single strip.

The object of the invention is to make a very sensitive instrument, convenient in form, and self-regulating, and to adapt it generally to the special requirements of a clinical thermometer.

Figure 4:
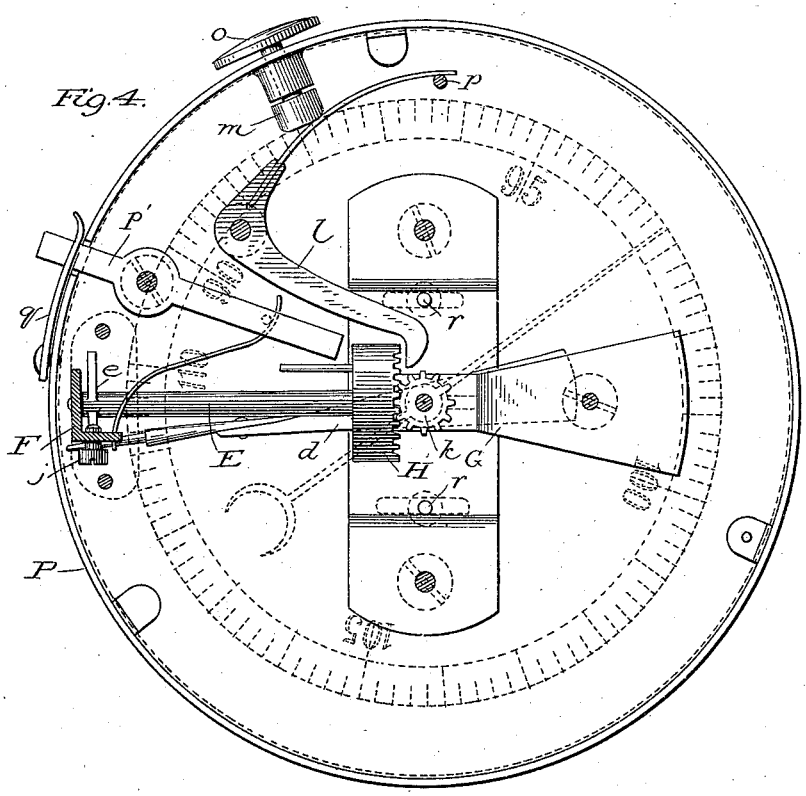
Figure 5:
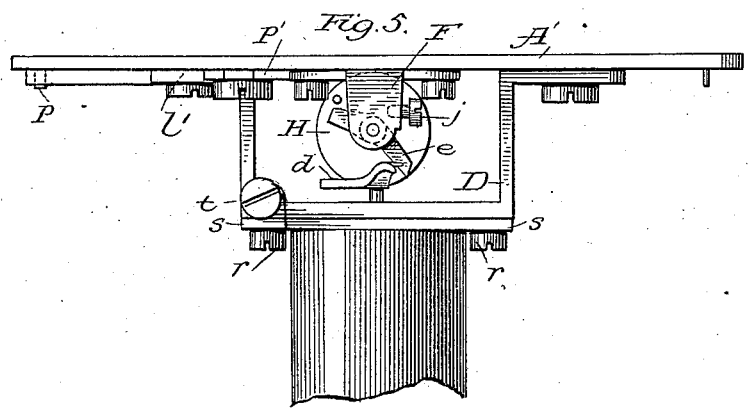

In the accompanying drawings, Figure 1 is a side elevation of the device, on an enlarged scale, with the upper and lower portions of the case in section. Fig. 2 is a side elevation of the device on a smaller scale, case partly broken away. Fig. 3 shows on an enlarged scale the index-finger and immediate operating devices. Fig. 4 is a horizontal section on line $x\ x$, Fig. 1. Fig. 5 is a detail view.

The same general form of laminated spring shown in an application filed by me in the United States Patent Office, of even date herewith, is in use in this invention. It is marked A, and is contained in the lower part, $b$, a hollow stem, B, of the instrument. The upper part of the stem (marked $a$) is connected to the plate A', on which the dial-plate is fixed. The guide-straps $c\ c$, attached to the upper section of the stem, prevent the outer case from touching the spiral coil, and by means of two pins, 1 1, set in a cross-piece attached to the lower ends of these strips, and entering a small block fixed to the lower end of the coil, the said lower end is held from turning. To the upper end of the laminated coil is attached a staff, which is within the upper part of the case, and turns with the coil as the latter expands or contracts. It projects above the bottom plate of the bridge D, to which the plate A' is fixed, and carries, secured on its upper end, an arm, $d$, which, as the staff turns, moves in a plane parallel with the plate A'; and just underneath the same. As it thus moves it strikes against an arm, $e$, on the end of a shaft, E, and within its sweep, which latter has its bearings at the outer end in a small bracket, F, and at the inner end in a larger bracket, G. On the inner end of this shaft is staked a crown-wheel, H, which engages with a pinion, $k$, on the spindle, which carries the index-finger. The amount of motion which the arm $d$ will impart to the small arm $e$ by a given amount of movement of said arm $d$ will depend upon the distance from the shaft E at which it strikes the said arm $e$. The arm $d$ is therefore provided with a joint, by means of which its outer end may be raised or lowered, and thus the action of the hand is decreased or increased until its time rate of movement is obtained. The movement of the arm $e$ is limited by means of a set-screw, $j$, in the outer bridge, so as to make the action equal and regular. If not properly set by this screw, the instrument would move too fast at the commencement of its action, and too slowly toward the close. The shaft E is thus rocked in certain limits, and the wheel H is made large enough in relation to the pinion $k$ to give the necessary movement to the index-finger.

The dial-plate is marked into degrees from 90° to 110° Fahrenheit, and the degrees are subdivided into fifths or tenths; but this may be varied, if found desirable.

This instrument is a registering one. The action of the increasing temperature on the coil moves the arm $d$, rocks the shaft E by pushing aside the arm $e$, then leaving the arm $e$, and consequently the index-finger, at the maximum point attained to indicate that point. If so desired, the hand may be held more firmly, after it has reached the maximum point, by means of a brake, $l$, in the form of a bell-crank lever. One arm presses upon the wheel H. The other is in the form of a spring, against which the stem $m$ of a knob, $o$, may be pressed. The movement of the spring-arm is limited by a stop, $p$.

In order to reset the instrument by bringing the finger back to 90°, I have provided a lever, $t'$, the outer end of which projects through the case, and may be held by a catch, $q$. The inner end strikes against a pin properly set in the wheel H to bring the index-finger back to the 90° point. This is done, of course, after the temperature has fallen below 90° Fahrenheit; otherwise the hand would return to the actual temperature.

The hand may be set by loosening the two screws *r r*, which hold the stem to the bridge, and as these screws pass through slots in the ears *s s*, the stem may be turned by set-screw *t*, or any other suitable means. This turns the coil to the proper place for the index-finger.

The mechanism is covered by a suitable cover, P, which is slipped on over the stem, and into the upper part of which the glass top is screwed.

The stem containing the coil is the only part of the instrument which need be in contact with the body of the patient, and its form is adapted to the purpose.

I prefer to use for the coil laminæ of steel and brass brazed together.

I claim as my invention—

1. A clinical thermometer consisting of a dial-plate having suitable index-finger, a stem attached to the rear of the dial-plate, a bi-metallic spiral coil within said stem, and fixed thereto at its lower end, an arm connected to its upper end, and mechanism connected to the spindle of the index-finger, adapted to be struck and pushed by the said arm, whereby the said finger is advanced as the temperature of the coil rises, substantially as described.

2. In combination, the hollow stem and coil having a staff fixed to the upper end of said coil, an arm on upper end of said staff, a rocking shaft having an arm within the sweep of the staff-arm, a crown-wheel on the inner end of the rocking shaft, and a pinion on the spindle of the index-finger, all substantially as described.

3. In combination with the rock-shaft of the thermometer, having an arm, *e*, the jointed arm of the coil-staff, as and for the purpose set forth.

4. In a clinical thermometer, an index-finger and a laminated coil, with intermediate mechanism connecting it to the finger, whereby the movement of the coil pushes the finger over the dial, and a brake mechanism, the parts being combined and operating as described.

In testimony whereof I have signed my name to this specification in the presence of two subscribing witnesses.

WILLIAM B. FOWLE.

Witnesses:
A. LINCOLN FOWLE,
GEORGE H. BOURNE.